United States Patent
Eguchi et al.

(10) Patent No.: US 7,576,944 B2
(45) Date of Patent: Aug. 18, 2009

(54) SHIELDING FUNCTION FOR MAGNETIC HEAD IN MAGNETIC DISK DEVICE

(75) Inventors: Takehiko Eguchi, Ibaraki (JP); Toshihiko Shimizu, Ibaraki (JP); Mikio Tokuyama, Ibaraki (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 397 days.

(21) Appl. No.: 11/241,576

(22) Filed: Sep. 30, 2005

(65) Prior Publication Data

US 2006/0072240 A1    Apr. 6, 2006

(30) Foreign Application Priority Data

Oct. 1, 2004   (JP)   ............................. 2004-289705

(51) Int. Cl.
*G11B 5/012*   (2006.01)

(52) U.S. Cl. .................................................. 360/97.01
(58) Field of Classification Search .............. 360/97.01, 360/97.02, 137; 361/685
See application file for complete search history.

(56) References Cited

U.S. PATENT DOCUMENTS

| | | | | |
|---|---|---|---|---|
| 5,600,509 | A | * | 2/1997 | Kawakami ............... 360/97.02 |
| 7,251,131 | B2 | * | 7/2007 | Shah et al. .................. 361/685 |
| 7,298,583 | B2 | * | 11/2007 | Miyazaki et al. ......... 360/97.01 |
| 2002/0141109 | A1 | * | 10/2002 | Nguy ...................... 360/97.02 |
| 2003/0043499 | A1 | * | 3/2003 | Shimomura et al. ...... 360/97.01 |

FOREIGN PATENT DOCUMENTS

JP        2003-077266 A        3/2003

* cited by examiner

*Primary Examiner*—Tianjie Chen
(74) *Attorney, Agent, or Firm*—Townsend and Townsend and Crew LLP; Darren Gold

(57) ABSTRACT

Embodiments of the invention provide a magnetic disk device capable of improving the shielding function for the magnetic head yet maintaining a form factor. In one embodiment, a magnetic disk device comprises a magnetic disk; a magnetic head for recording/reproducing information; a magnetic disk drive mechanism for moving magnetic head in the radial direction of the magnetic disk; a housing including a base and a cover having a nonmagnetic material; and a magnetic shielding member having a magnetic material. The housing has a cut-away portion corresponding to a range in which the magnetic head moves, and the magnetic shielding member is formed in a U-shape including an upper wall portion, a side wall portion and a bottom wall portion. The magnetic shielding member covers the range in which the magnetic head moves, and is disposed in the cut-away portion so as to form substantially the same surface as the surfaces of the upper wall, side wall and bottom wall of the housing.

9 Claims, 5 Drawing Sheets

SHIELDING FUNCTION FOR MAGNETIC HEAD IN MAGNETIC DISK DEVICE

CROSS-REFERENCES TO RELATED APPLICATIONS

This application claims priority from Japanese Patent Application No. JP2004-289705, filed Oct. 1, 2004, the entire disclosure of which is incorporated herein by reference.

BACKGROUND OF THE INVENTION

This invention relates to a magnetic disk device and, particularly, to a magnetic disk device for recording information into magnetic disks relying upon a vertical magnetic recording system.

In the magnetic disk devices in recent years, attempts have been made to improve the conventional longitudinal magnetic recording system and to develop a vertical magnetic recording system in an effort to increase the recording density.

A magnetic disk device which is based upon the vertical magnetic recording system, generally, uses a single magnetic pole head and a magnetic disk medium of a two-layer structure. In this magnetic disk device, the single magnetic pole head works to concentrate the external disturbing magnetic field entering from the exterior of the device, giving rise to a problem of destroying the data on the disk medium just under the recording magnetic pole of the single magnetic pole head. In the magnetic disk device employing the vertical magnetic recording system, therefore, a magnetic shielding function which prevents the entrance of the external magnetic field into the device plays a more important role than in the conventional device which utilizes the lengthwise magnetic recording system.

Therefore, there has heretofore been devised a magnetic disk device as indicated in JP-A-2003-77266 (patent document 1). The magnetic disk device of the patent document 1 comprises a rotary disk-type magnetic disk for recording information relying upon the vertical magnetic recording system, a magnetic head for recording information into the magnetic disk and for reproducing information from the magnetic disk, a disk drive mechanism for supporting the magnetic head in a manner to move in the radial direction of the magnetic disk, a housing having a base and a cover, and a magnetic shielding member constituted by using a magnetic member to magnetically shield the magnetic head.

In an embodiment illustrated in FIGS. 1 to 16 of the patent document 1, the housing accommodates therein the magnetic disk, magnetic head and disk drive mechanism, and a magnetic shielding member is provided over the upper surface, lower surface and side surfaces of the housing inclusive of the upper and lower sides over a range in which the magnetic head moves (prior art 1).

In an embodiment illustrated in FIG. 17 of the patent document 1, the housing accommodates therein the magnetic disk, the magnetic head, the disk drive mechanism and the magnetic shielding member, the magnetic shielding member being provided only over the base portion and the cover portion that are facing the magnetic head (prior art 2).

In an embodiment illustrated in FIG. 18 of the patent document 1, the housing accommodates therein the magnetic disk, the magnetic head and the disk drive mechanism, the housing is partly cut away, a magnetic shielding member is disposed therein, the front end side of the magnetic shielding member is extended to both sides of the magnetic disk, and the end surfaces thereof are faced to the end surface of the magnetic head (prior art 3).

In an embodiment illustrated in FIG. 19 of the patent document 1, the housing accommodates therein the magnetic disk, the magnetic head and the disk drive mechanism, a recessed portion is formed in the outer surface of the housing, a magnetic shielding member is disposed in the recessed portion, the front end side of the magnetic shielding member is extended to both sides of the magnetic disk, and the ends thereof are faced to the end of the magnetic head (prior art 4).

BRIEF SUMMARY OF THE INVENTION

According to the prior art 1, however, a problem exists in that the magnetic shielding member is provided on the housing separated away from the magnetic head and, hence, the shielding function is not fully exhibited and, further, the external size increases by the size of the magnetic shielding member. However, limitation has been imposed on the size of the magnetic disk device of this kind such as of the 2.5-type (mobile type) and the 3.5-type, and it is important that the predetermined size (form factor) is not exceeded even when the magnetic shielding function is imparted. In the magnetic disk devices for a mobile use mounted on the notebook personal computers and on the portable data terminals, in particular, very strict requirements or limitations are imposed on decreasing the thickness, and difficulty is involved in employing a structure that has an increased thickness relative to the currently employed magnetic disk devices, causing a serious hindrance to realizing a magnetic disk device of the vertical recording system.

According to the prior art 2, there is a problem that the magnetic shielding member is provided on only the base portion and the cover portion that face the magnetic head, making it difficult to exhibit the shielding function to a sufficient degree.

According to the prior art 3 or 4, the magnetic shielding members are provided by the sides of the magnetic head, leading to a problem in that the shielding function is not exhibited to a sufficient degree.

It is a feature of the present invention to provide a magnetic disk device capable of improving the shielding function for the magnetic head yet maintaining a form factor.

In accordance with a first embodiment of the invention, a magnetic disk device comprises a rotary disk-type magnetic disk; a magnetic head for recording information into the magnetic disk and for reproducing information from the magnetic disk; a magnetic disk drive mechanism for supporting the magnetic head and for moving the magnetic head in the radial direction of the magnetic disk; a housing including a base constituted by a nonmagnetic material and a cover constituted by a nonmagnetic material; and a magnetic shielding member constituted by a magnetic material; wherein the housing has a cut-away portion spanning across an upper wall portion, a side wall portion and a bottom wall portion corresponding to a range in which the magnetic head moves; and the magnetic shielding member is formed in a U-shape including an upper wall portion, a side wall portion and a bottom wall portion, covers the range in which the magnetic head moves, and is disposed in the cut-away portion so as to form substantially the same surface as the surfaces of the upper wall, side wall and bottom wall of the housing.

More preferred concrete constitutions of the first embodiment of the invention are as follows:

(1) The thicknesses of the upper wall portion, side wall portion and bottom wall portion of the magnetic shielding member are selected to be nearly equal to the thicknesses of the upper wall portion, side wall portion and bottom wall portion of the housing.

(2) Engaging steps are provided to protrude inwardly of the cut-away portion from the upper wall portion and the bottom wall portion of the housing, and the upper wall portion and the bottom wall portion of the magnetic shielding member are disposed in a manner of being overlapped on and contacted to the engaging steps of the upper wall portion and bottom wall portion of the housing.

(3) An end surface forming the cut-away portion of the housing and an end surface of the magnetic shielding member are fixed with an adhesive so as to be air-tightly held together.

(4) A seal for maintaining air-tightness is stuck spanning from the surfaces of the upper wall portion, side wall portion and bottom wall portion of the housing over to the surfaces of the upper wall portion, side wall portion and bottom wall portion of the magnetic shielding member.

In accordance with a second embodiment of this invention, a magnetic disk device comprises a rotary disk-type magnetic disk; a magnetic head for recording information into the magnetic disk and for reproducing information from the magnetic disk; a magnetic disk drive mechanism for supporting the magnetic head and for moving the magnetic head in the radial direction of the magnetic disk; a housing including a base constituted by a nonmagnetic material and a cover constituted by a magnetic material; and a circuit board for controlling a magnetic disk device; wherein the circuit board has a silicon steel plate core and is disposed on the lower surface side of the base; and the cover has a tongue portion that extends to be magnetically connected to the silicon steel plate core of the circuit board.

More preferred concrete constitutions of the second embodiment of the invention are as follows:

(1) A recessed portion is formed in the surface of the side wall of the housing enabling the tongue portion to pass up and down.

(2) A flexible buffer member is arranged between the base and the circuit board, and the tongue portion is arranged between the buffer member and the circuit board so as to be pushed onto the circuit board upon receiving an elastic force of the buffer member.

In accordance with a third embodiment of the invention, a magnetic disk device comprises a rotary disk-type magnetic disk; a spindle motor for rotating the magnetic disk; a magnetic head for recording information into the magnetic disk and for reproducing information from the magnetic disk; a magnetic disk drive mechanism for supporting the magnetic head and for moving the magnetic head in the radial direction of the magnetic disk; a housing including a base constituted by a magnetic material; and a silicon steel plate core substrate having a silicon steel plate core; wherein the silicon steel plate core substrate is so disposed in the base as to cover a range in which the magnetic head moves; and the silicon steel plate core is magnetically connected to the base.

A more preferred concrete constitution of the third embodiment of the invention is as follows:

(1) The silicon steel plate core is also used as the stator core of the spindle motor.

The invention provides a magnetic disk device capable of improving the shielding function for the magnetic head yet maintaining a form factor.

DETAILED DESCRIPTION OF THE INVENTION

Figure 1:
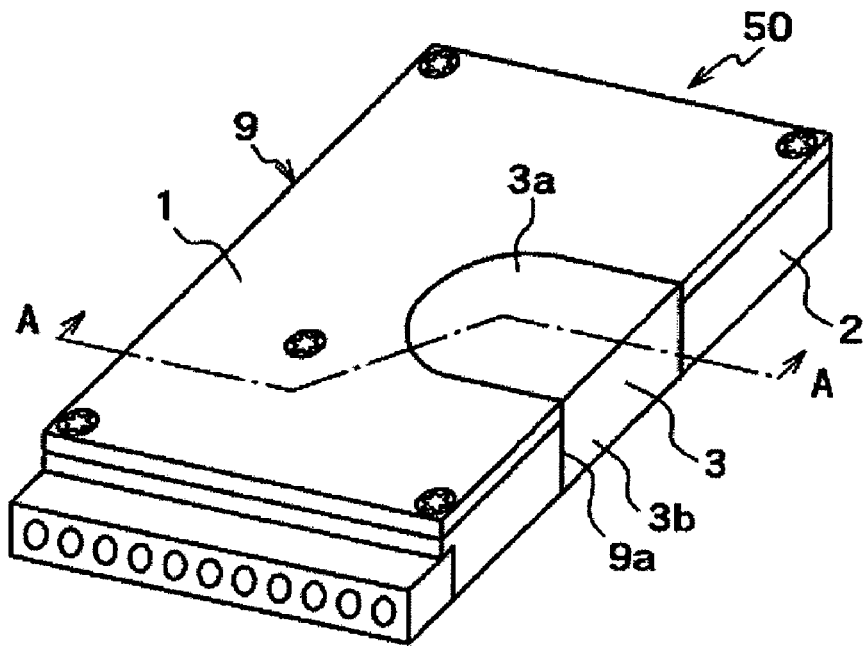
FIG. 1 is a perspective view illustrating a magnetic disk device according to a first embodiment of the invention.

A plurality of embodiments of the invention will now be described with reference to the drawings. In the drawings of the embodiments, the same reference numerals represent the same parts or the corresponding parts.

First Embodiment

Figure 2:
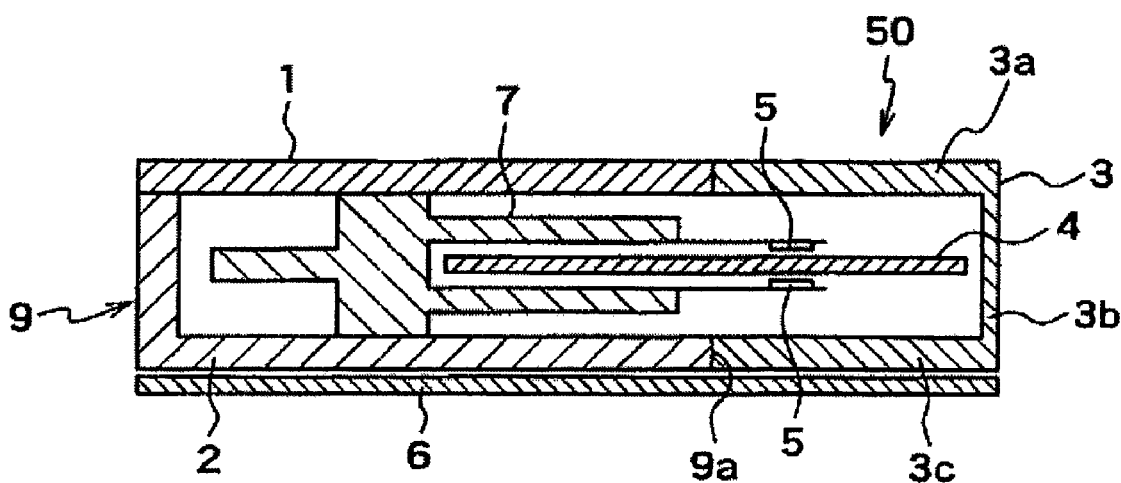
FIG. 2 is a sectional view along A-A in FIG. 1.

First, a magnetic disk device of a first embodiment of the invention will now be described with reference to FIGS. 1 and 2. FIG. 1 is a perspective view illustrating the magnetic disk device according to the first embodiment of the invention, and FIG. 2 is a sectional view along A-A in FIG. 1.

The magnetic disk device 50 includes a rotary disk-type magnetic disk 4, a magnetic head 5 for recording information into the magnetic disk and for reproducing information from the magnetic disk, a magnetic disk drive mechanism 7 for supporting the magnetic head 5 and for moving the magnetic head 5 in the radial direction of the magnetic disk 4, a housing 9 constituted by a base 2 made of a nonmagnetic material and a cover 1 made of a nonmagnetic material, a magnetic shielding member 3 made of a magnetic material, and a circuit board 6 for controlling the magnetic disk device 50.

The magnetic disk 4 is constituted by a rotary disk-type magnetic disk with which information is recorded onto annular tracks by the vertical magnetic recording system, and is fixed to a rotary portion of a spindle mechanism (not shown) so as to be rotated at a high speed. There are provided many annular tracks from the inner circumference toward the outer circumference of the magnetic disk 4. The magnetic head 5 is moved and positioned on the tracks to conduct the recording or reproducing operation. The magnetic disk 4 is constituted as a single piece, and the magnetic head 5 is mounted on each of the front surface side (cover side) and the back surface side (base side) of the magnetic disk 4.

The magnetic disk drive mechanism 7 is constituted by a suspension, an arm, a voice coil motor and the like. The circuit board 6 has nearly the same width as that of the base 2 and is mounted on the bottom surface of the base 2.

The housing 9 is constituted in the shape of a small thickness so as to be easily incorporated in the notebook personal computers and in the portable data terminals. The housing 9 has a cut-away portion 9a formed by cutting away the upper wall portion, the side wall portion and the bottom wall portion so as to be corresponded to a range in which the magnetic head 5 moves. In other words, the cut-away portion 9a is formed by cutting the cover 1 and the base 2 away.

The magnetic shielding member 3 is formed in a U-shape including the upper wall portion 3a, the side wall portion 3b and the bottom wall portion 3c. As the magnetic material constituting the magnetic shielding member 3, there can be suitably used iron, a stainless steel material of the type of martensite, a silicon steel and a permalloy. The magnetic shielding member 3 is so disposed as to cover a range in which the magnetic head 5 moves. In other words, the magnetic shielding member 3 of the U-shape is so disposed as to hold the magnetic disk 4 and the magnetic head 5 therein, the upper wall portion 3a is positioned above the magnetic head 5 on the upper side of the magnetic disk 4 and is extending over a range in which the magnetic head 5 moves, and the bottom wall portion 3c is positioned under the magnetic head 5 on the lower side of the magnetic disk 4 and is extending over a range in which the magnetic head 5 moves.

The magnetic shielding member 3 is disposed in the cut-away portion 9a so as to form substantially the same surface as the surfaces of the upper wall, side wall and bottom wall of the housing 9. In this embodiment, the surfaces of the upper wall, side wall and bottom wall of the housing 9 are formed flat, and the surfaces of the upper wall portion 3a, side wall portion 3b and bottom wall portion 3c of the magnetic shielding member 3 are formed to be flushed with the above surfaces. Further, the thicknesses of the upper wall portion 3a, side wall portion 3b and bottom wall portion 3c of the magnetic shielding member 3 are selected to be nearly equal to the thicknesses of the upper wall portion, side wall portion and bottom wall portion of the housing 9. Therefore, the same function as that of the conventional housing is obtained even by using the magnetic shielding member 3.

The housing 9 and the magnetic shielding member 3 are fixed together via an adhesive. Concretely, an end surface forming the cut-away portion 9a of the housing 9 and an end surface of the magnetic shielding member 3 are fixed with an adhesive so as to be air-tightly held together. This makes it possible to obtain air-tightness in the housing and the housing strength comparable to those of the conventional housing.

Described below is a mechanism of the magnetic shielding effect by using the magnetic shielding member 3. When an external magnetic field perpendicular to the disk surface flows from the upper side of the disk surface to the lower side thereof, the magnetic flux is collected on the upper wall portion 3a, flows into the bottom wall portion 3c through the side wall portion 3b, and goes out to the external side from the bottom wall portion 3c. Thus, the magnetic flux of the external magnetic field flows, avoiding the magnetic head 5 held by the magnetic shielding member 3, preventing erroneous operations such as erasing the information on the disk surface or writing incorrect data onto the disk surface, that occurs when the magnetic field is collected by the magnetic head for vertical recording. When the external magnetic field flows perpendicularly to the disk surface from the lower side of the disk surface to the upper side thereof, the magnetic flux reversely flows through the magnetic shielding member 3 exhibiting the same magnetic shielding effect.

According to this embodiment, the housing 9 is provided with the cut-away portion 9a spanning across the upper wall portion, the side wall portion and the bottom wall portion corresponding to the range in which the magnetic head 5 moves. Further, the magnetic shielding member 3 is formed in a U-shape including the upper wall portion 3a, the side wall portion 3b and the bottom wall portion 3c, covers the range in which the magnetic head 5 moves, and is disposed in the cut-away portion 9a so as to form substantially the same surface as the surfaces of the upper wall, side wall and bottom wall of the housing 9. It is, therefore, allowed to realize the magnetic disk device exhibiting an improved shielding function for the magnetic head yet maintaining the form factor.

Second Embodiment

Figure 3:
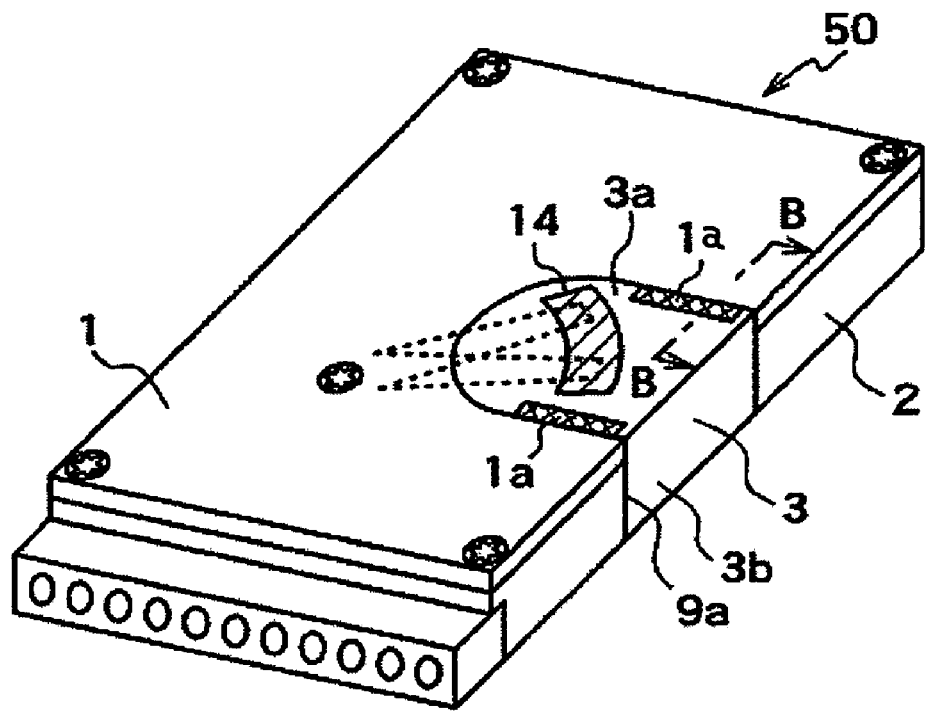
FIG. 3 is a perspective view illustrating the magnetic disk device according to a second embodiment of the invention.
Figure 4:
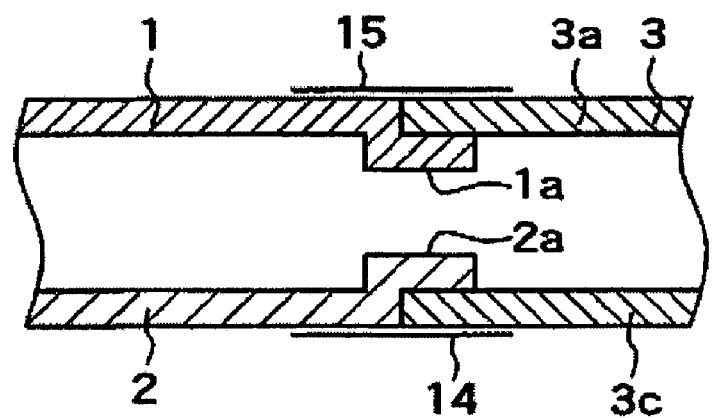
FIG. 4 is a sectional view along B-B in FIG. 3.

A second embodiment of the invention will be described next with reference to FIGS. 3 and 4. FIG. 3 is a perspective view of the magnetic disk device according to the second embodiment of the invention, and FIG. 4 is a sectional view along B-B in FIG. 3. The second embodiment is different from the first embodiment with respect to a point described below. In other respects, however, the second embodiment is basically the same as the first embodiment.

In the second embodiment, the upper wall portion 3a of the magnetic shielding member 3 is brought into contact with the engaging step 1a of the upper wall portion (cover 1) of the housing 9, and the bottom wall portion 3c of the magnetic shielding member 3 is brought into contact with the engaging step 2a of the bottom wall portion (bottom wall portion of the base 2) of the housing 9 in a manner of being overlapped thereon, and the magnetic shielding member 3 is disposed in the cut-away portion 9a. Due to these engaging steps 1a and 2a, the magnetic shielding member 3 is easily positioned and is disposed in the cut-away portion 9a. Further, the magnetic shielding member 3 can be held by the housing 9 via the engaging steps 1a and 2a to obtain a strong resistance against the external shocks.

As represented by hatched portions in FIG. 3, the engaging steps 1a and 2a are provided on opposing surfaces of the cut-away portion 9a and at a place deviated from the region 14 (hatched area) where the magnetic head moves as indicated by tilted lines in FIG. 2.

In the second embodiment, further, the seal 15 for maintaining air-tightness is stuck spanning from the surfaces of the upper wall portion, side wall portion and bottom wall portion of the housing 9 over to the surfaces of the upper wall portion 3a, side wall portion 3b and bottom wall portion 3c of the magnetic shielding member 3. Therefore, the interior of the magnetic disk device is maintained air-tight from the exterior. In the second embodiment, in particular, the engaging steps 1a and 2a are provided to hold the magnetic shielding member 3, offering an advantage in that the seal 15 for maintaining air-tightness does not have to possess so large strength. If the overlapping surfaces of the engaging steps 1a, 2a and the magnetic shielding member 3 are fixed together with the adhesive, there may be used a thin seal 15 which is simply for maintaining air-tightness.

Third Embodiment

Figure 5:
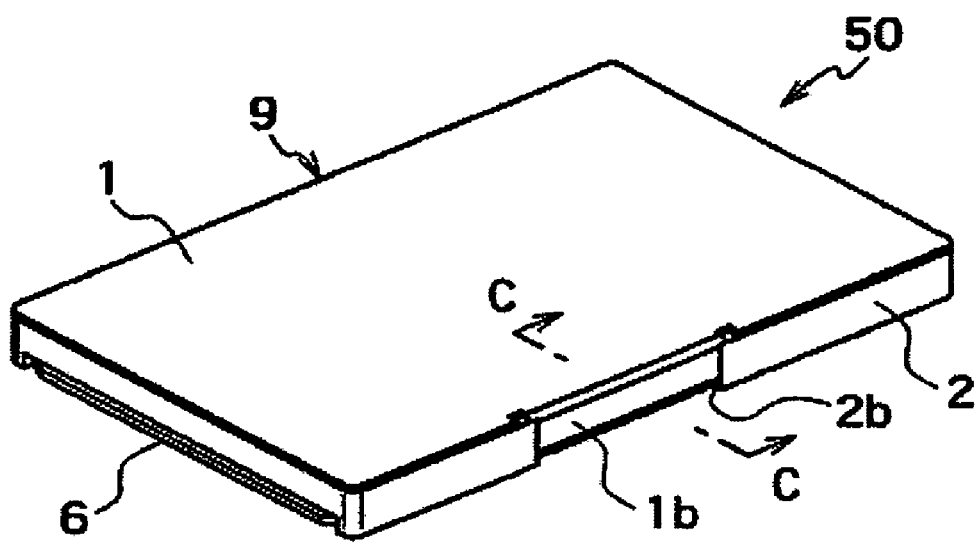
FIG. 5 is a perspective view illustrating the magnetic disk device according to a third embodiment of the invention.
Figure 6:
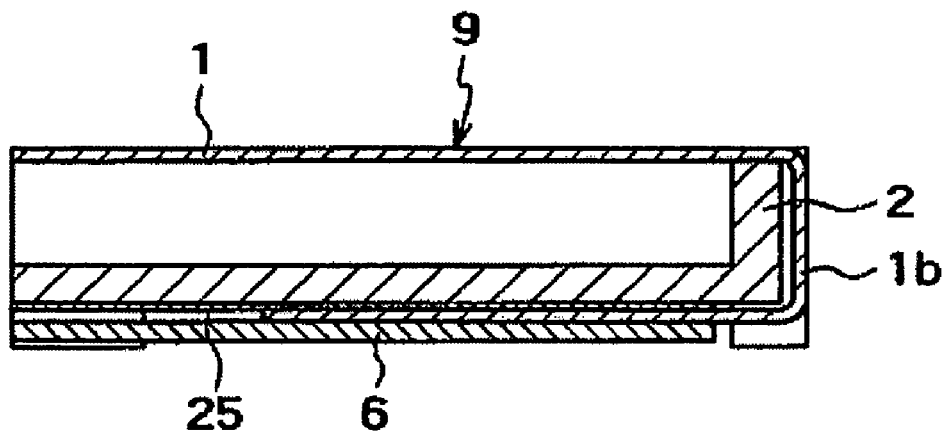
FIG. 6 is a sectional view along C-C in FIG. 5.
Figure 7:
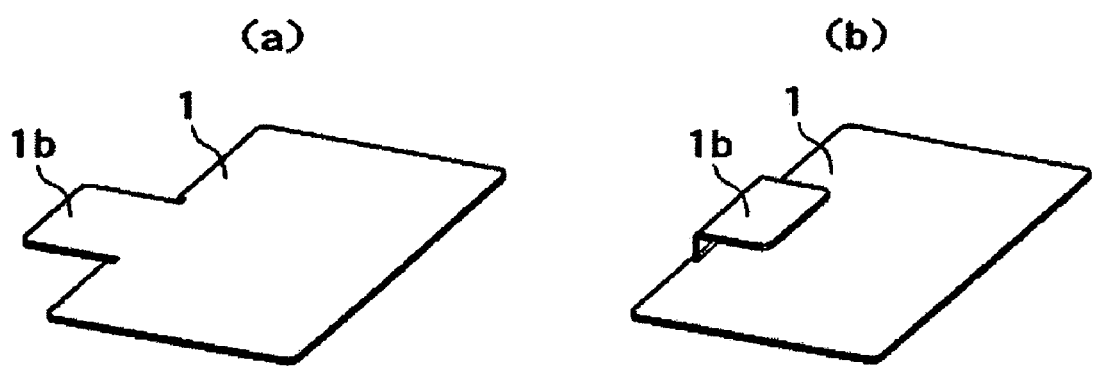
FIG. 7 is a perspective view illustrating a method of producing a cover used in the third embodiment.

A third embodiment of the invention will be described next with reference to FIGS. 5 to 7. FIG. 5 is a perspective view of the magnetic disk device according to the third embodiment of the invention, FIG. 6 is a sectional view along C-C in FIG. 5, and FIG. 7 is a perspective view illustrating a method of producing the cover 1 used in the third embodiment. Here, FIG. 6 does not show the parts in the housing. The third embodiment is different from the first embodiment with respect to a point described below. In other respects, however, the third embodiment is basically the same as the first embodiment.

In the third embodiment, the cover 1 is made of a magnetic material, the base 2 is made of a nonmagnetic material, and the circuit board 6 has a silicon steel plate core. A buffer member 25 is arranged between the circuit board 6 and the base 2. The cover 1 is provided with a tongue portion 1b extending from one side thereof. The tongue portion 1b is vertically folded downward from the cover 1, and the vertical portion is further folded horizontally so as to enter into between the base 2 and the circuit board 6. A recessed portion 2b is formed in the surface of the side wall of the housing 9 permitting the tongue portion 1b to pass through up and down. The tongue portion 1b is thus provided maintaining the form factor.

The buffer member 25 between the base 2 and the circuit board 6 is compressed between the tongue portion 1b and the base 2, and works to push and intimately attach the tongue portion 1b to the circuit board 6. Due to this, the tongue portion 1b and the circuit board 6 are contacted together without gap, the tongue portion 1b being magnetically connected to the silicon steel plate core of the circuit board 6. Therefore, an excellent magnetic shielding function is realized by the cover 1 and the silicon steel plate core of the circuit board 6. The circuit board 6 has at least a portion for covering a range in which the magnetic head 5 moves and the silicon steel plate core connected thereto and is laminated over a portion that comes in contact with the tongue portion 1b.

The cover 1 of the shape of a flat plate having a tongue portion 1b is formed as shown in FIG. 7(a), the tongue portion 1b is folded in a U-shape as shown in FIG. 7(b) prior to being assembled into the magnetic disk device, and the cover 1 is so mounted as to hold the base 2 and the buffer member 25 therein. Thus, the cover 1 having a magnetic shielding function is easily disposed.

Fourth Embodiment

Figure 8:
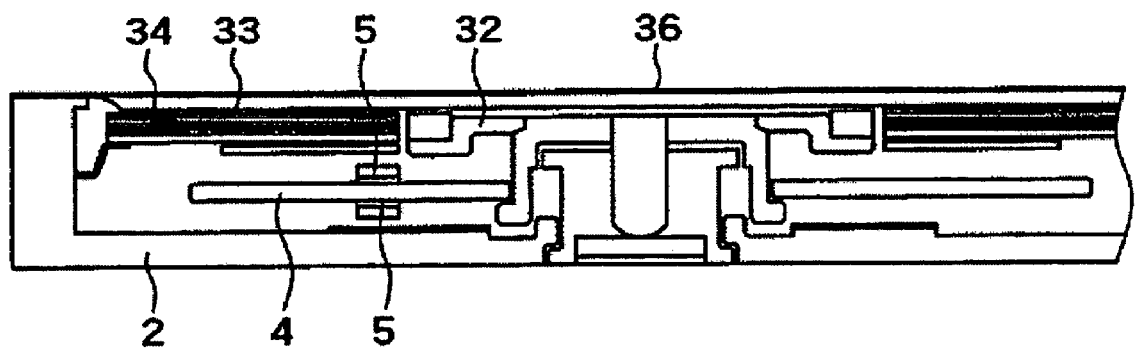
FIG. 8 is a sectional view illustrating a major portion of the magnetic disk device according to a fourth embodiment of the invention.
Figure 9:
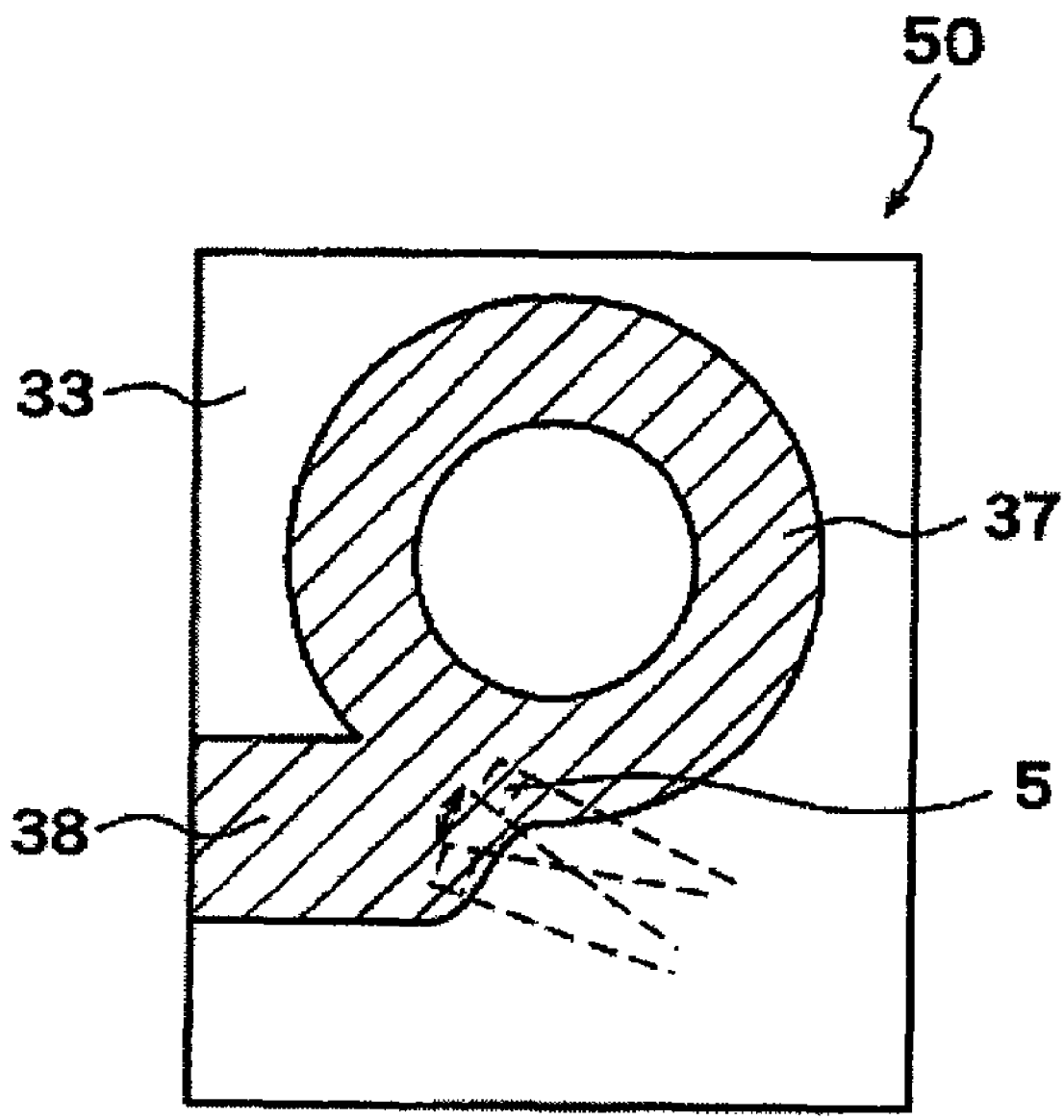
FIG. 9 is a plan view illustrating a range where a silicon steel plate core of the fourth embodiment exists.

A fourth embodiment of the invention will be described next with reference to FIGS. 8 and 9. FIG. 8 is a sectional view illustrating a major portion of the magnetic disk device of the fourth embodiment of the invention, and FIG. 9 is a plan view illustrating a range where the silicon steel plate core of the fourth embodiment exists. The fourth embodiment is different from the first embodiment with respect to a point described below. In other respects, however, the fourth embodiment is basically the same as the first embodiment.

In the fourth embodiment, the base 2 is made of a magnetic material, and a silicon steel plate core substrate 33 is mounted on the opening of the base 2 as shown in FIG. 8. A seal 36 for maintaining air-tightness is stuck spanning from above the silicon steel plate core substrate 33 to the base 2. The silicon steel plate core substrate 33 is working as a cover. The silicon steel plate core substrate 33 has a silicon steel plate core 34. The silicon steel plate core 34 is working as a stator of a spindle motor 32 that rotates the magnetic disk 31.

Referring to FIG. 9, the silicon steel plate core 34 of the silicon steel plate core substrate 33 is provided at least on a region 37 constituting the stator of the spindle motor 32 and on a region 38 continuous from the range in which the magnetic head 34 moves to the one side of the base 2. The silicon steel plate core 34 of the silicon steel plate core substrate 33 is in contact with the base 2 and is magnetically connected thereto at the outer circumference thereof.

A U-shaped magnetic shielding portion is constituted by the silicon steel plate core 34 made of the magnetic material and by the base 2 made of the magnetic material. The magnetic shielding portion of the U-shape is covering the range in which the magnetic head 5 moves to realize an excellent magnetic shielding function.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims alone with their full scope of equivalents.

What is claimed is:

1. A magnetic disk device comprising:
   a rotary disk-type magnetic disk;
   a magnetic head for recording information into said magnetic disk and for reproducing information from said magnetic disk;
   a magnetic disk drive mechanism configured to support said magnetic head and move said magnetic head in the radial direction of said magnetic disk;
   a housing including a base having a nonmagnetic material and a cover having a nonmagnetic material; and
   a magnetic shielding member having a magnetic material;
   wherein said housing has a cut-away portion spanning across an upper wall portion, a side wall portion and a bottom wall portion corresponding only to a range in which the magnetic head moves; and
   wherein said magnetic shielding member is formed in a U-shape including an upper wall portion, a side wall portion and a bottom wall portion, covers the range in which said magnetic head moves, and is disposed in said cut-away portion so as to form substantially the same surfaces as the surfaces of the upper wall, side wall and bottom wall of the cutaway portion of said housing;
   wherein the upper wall portion of the shielding member is U-shaped.

2. A magnetic disk device according to claim 1, wherein the thicknesses of the upper wall portion, side wall portion and bottom wall portion of said magnetic shielding member are selected to be nearly equal to the thicknesses of the upper wall portion, side wall portion and bottom wall portion of said housing, respectively.

3. A magnetic disk device according to claim 2, wherein engaging steps are provided to protrude inwardly of said cut-away portion from the upper wall portion and the bottom wall portion of said housing, and the upper wall portion and the bottom wall portion of said magnetic shielding member are disposed in a manner of being overlapped on and contacted to said engaging steps of said upper wall portion and bottom wall portion of said housing.

4. A magnetic disk device according to claim 3, wherein an end surface forming the cut-away portion of said housing and an end surface of said magnetic shielding member are fixed with an adhesive so as to be air-tightly held together.

5. A magnetic disk device according to claim 3, wherein a seal for maintaining air-tightness is stuck spanning from the surfaces of the upper wall portion, side wall portion and bottom wall portion of said housing over to the surfaces of the upper wall portion, side wall portion and bottom wall portion of said magnetic shielding member.

6. A magnetic disk device according to claim 2, wherein an end surface forming the cut-away portion of said housing and an end surface of said magnetic shielding member are fixed with an adhesive so as to be air-tightly held together.

7. A magnetic disk device according to claim 2, wherein a seal for maintaining air-tightness is stuck spanning from the surfaces of the upper wall portion, side wall portion and bottom wall portion of said housing over to the surfaces of the upper wall portion, side wall portion and bottom wall portion of said magnetic shielding member.

8. A magnetic disk device according to claim 1, wherein an end surface forming the cut-away portion of said housing and an end surface of said magnetic shielding member are fixed with an adhesive so as to be air-tightly held together.

9. A magnetic disk device according to claim 1, wherein a seal for maintaining air-tightness is stuck spanning from the surfaces of the upper wall portion, side wall portion and bottom wall portion of said housing over to the surfaces of the upper wall portion, side wall portion and bottom wall portion of said magnetic shielding member.

* * * * *

UNITED STATES PATENT AND TRADEMARK OFFICE
CERTIFICATE OF CORRECTION

PATENT NO. : 7,576,944 B2 Page 1 of 1
APPLICATION NO. : 11/241576
DATED : August 18, 2009
INVENTOR(S) : Eguchi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 546 days.

Signed and Sealed this

Seventh Day of September, 2010

David J. Kappos
*Director of the United States Patent and Trademark Office*